US012671947B2

(12) United States Patent
Jávori et al.

(10) Patent No.: US 12,671,947 B2
(45) Date of Patent: Jun. 30, 2026

(54) HYBRID SOUND RADIATION DEVICE FOR VIBRATING A HEAVY-WEIGHT RIGID PLATE AT AUDIO FREQUENCIES

(71) Applicant: SENSONIC DESIGN ZRT., Györ (HU)

(72) Inventors: Dávid Vilmos Jávori, Budapest (HU); Sándor Szabó, Budapest (HU)

(73) Assignee: SENSONIC DESIGN IRELAND LIMITED, Dublin (IE)

( * ) Notice: Subject to any disclaimer, the term of this patent is extended or adjusted under 35 U.S.C. 154(b) by 237 days.

(21) Appl. No.: 18/845,612

(22) PCT Filed: May 31, 2022

(86) PCT No.: PCT/EP2022/064705

§ 371 (c)(1),
(2) Date: Sep. 10, 2024

(87) PCT Pub. No.: WO2022/253806

PCT Pub. Date: Dec. 8, 2022

(65) Prior Publication Data

US 2025/0193608 A1 Jun. 12, 2025

(30) Foreign Application Priority Data

May 31, 2021 (EP) .................................... 21462001

(51) Int. Cl.
*H04R 23/02* (2006.01)
*H04R 1/02* (2006.01)
(Continued)

(52) U.S. Cl.
CPC ............ *H04R 23/02* (2013.01); *H04R 1/025* (2013.01); *H04R 3/00* (2013.01); *H04R 7/045* (2013.01);
(Continued)

(58) Field of Classification Search
CPC .......... H04R 23/02; H04R 1/025; H04R 3/00; H04R 7/045; H04R 9/046; H04R 9/06;
(Continued)

(56) References Cited

U.S. PATENT DOCUMENTS 10,805,714 B2 * 10/2020 Gomes .................. H04R 9/025
2003/0059080 A1 * 3/2003 Backman .............. H04R 9/025 381/396
(Continued)

*Primary Examiner* — Oyesola C Ojo
(74) *Attorney, Agent, or Firm* — Daniel S. Kim

(57) ABSTRACT

The hybrid sound radiation device according to the invention is used for vibrating a heavy-weight rigid plate at audio frequencies. The device comprises two voice coils arranged concentrically, the external voice coil being coupled to a fluid reservoir comprising a three-fluid medium having a substantially constant viscosity as a function of frequency. A third coil is arranged around the side wall of the fluid reservoir and two electrodes of opposite polarity are provided in the fluid reservoir for providing a substantially constant electric field inside the fluid reservoir. The device further comprises a vibrating element in the form of a heavy-weight, rigid, planar plate rigidly connected to the fluid reservoir; and control circuits connected to the first, second and third coils and the electrodes.

7 Claims, 4 Drawing Sheets

(51) Int. Cl.
*H04R 3/00* (2006.01)
*H04R 7/04* (2006.01)
*H04R 9/04* (2006.01)
*H04R 9/06* (2006.01)

(52) U.S. Cl.
CPC ............... *H04R 9/046* (2013.01); *H04R 9/06* (2013.01); *H04R 2209/022* (2013.01)

(58) Field of Classification Search
CPC .. H04R 2209/022; H04R 9/066; H04R 15/00; H04R 2201/021
See application file for complete search history.

(56) References Cited

U.S. PATENT DOCUMENTS

| | | | | |
|---|---|---|---|---|
| 2009/0208039 | A1* | 8/2009 | Suzuki | H10N 35/00 310/300 |
| 2016/0234588 | A1* | 8/2016 | Timothy | H04R 11/14 |
| 2018/0109893 | A1* | 4/2018 | Chu | H04R 7/16 |

* cited by examiner

HYBRID SOUND RADIATION DEVICE FOR VIBRATING A HEAVY-WEIGHT RIGID PLATE AT AUDIO FREQUENCIES

This is the national stage of International Application PCT/EP2022/064705, filed May 31, 2022.

The present invention relates to a sound radiation device in which an electromechanical transducer and a liquid-containing vibration transducer are integrated for audio frequency vibration of a heavy-weight rigid plate.

According to the current state of the art, loudspeakers are known in a wide variety of designs. Widely used speakers and other speaker devices are essentially physical systems that convert an input voltage signal into audio frequency vibrations. Depending on the use demands, diaphragms and vibration transducers of different designs are known in the loudspeakers.

The document EP1250827 discloses a modular speaker in which a plurality of integrated mechanisms vibrate a panel to produce an acoustic output. These mechanisms can be, for example, moving coil units, moving magnetic units or piezoelectric units. The individual mechanisms are connected to each other via switching elements, these switching elements ensure the transmission of energy to the panel. By combining different mechanisms, the output power of the modular speakers can be adjusted and optimized.

The document US2005226445 discloses a loudspeaker having a switching unit comprising a rheological medium. The rheological medium may be either magnetorheological or electrorheological fluid. By controlling the viscosity of the rheological medium, the vibration transducer can be rigidly or resiliently connected to the acoustic vibrating element so that the bending waves excited by the device can result in an acoustic output on the vibrating element.

The disadvantage of the above solutions is that the vibration transducers are only suitable for vibrating low-mass vibrating elements that are elastically deformable by vibration, but are not suitable for vibrating high-mass, rigid sheets, such as glass sheets or stone sheets, at adequate sound frequency.

Vibration of heavy-weight, large, rigid vibrating elements, such as glass slabs or stone slabs, at low frequencies can be accomplished with one or more large vibration transducers that can produce a force of sufficient magnitude. Vibration of said heavy-weight rigid plates at higher frequencies, typically above 1000 Hz, is not feasible with conventional electroacoustic transducers without significant sound quality degradation.

It is an object of the present invention to overcome the above-mentioned problems by providing a sound radiation device capable of vibrating large and heavy-weight rigid plates in both the low and high ranges of the audio frequency spectrum with substantially linear transmission characteristic.

The objects are achieved by a hybrid sound radiation device as defined in the appended claim.

The invention will now be described in more detail with reference to the drawings. In the drawings:

FIG. 1 is a schematic cross-sectional view of the structure of a hybrid sound vibrating system according to the invention;

FIG. 2 schematically illustrates the device design of the electronic control units of the hybrid sound vibrating system according to the invention;

Figure 1:
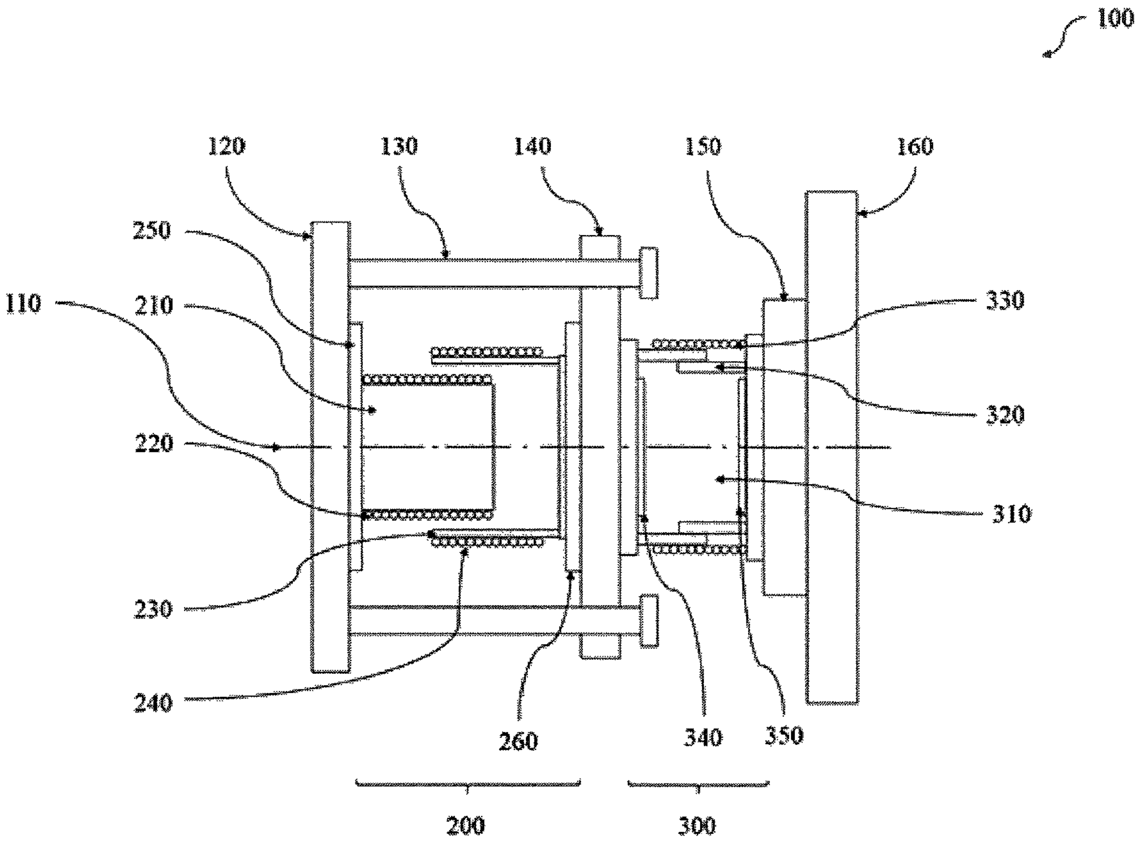

As shown in FIGS. 1 and 3-5, the hybrid sound vibrating device 100 of the present invention includes a vibrating element 160 formed as a large, heavy-weight, rigid planar plate. The material of the vibrating element 160 is preferably gres, stone, glass, wood, etc. The vibrating element 160 is particularly preferably an indoor wall covering element. The outer surface of the vibrating element 160 according to the invention, i.e. facing the acoustic space, can be flat, but it can also be a surface with a spatial (3D) pattern which is suitable for generating acoustic waves.

The actuating units of the hybrid sound vibrating device 100 are located on the front side of the vibrating element 160, namely on the back side, which is generally hidden from the user. The device 100 has a fixed-position support member 120 that secures the device 100 to the ground or other rigid support structure. The support member 120 may be provided with one or more unloading support members that substantially retain the vibrating element 160 and thereby relieve the other components of the hybrid sound vibrating device 100.

A primary resonator 200 is connected directly to the fixed support member 120. The primary resonator 200 is designed, as is known from conventional electrodynamic loudspeakers, as a moving coil unit which is able to move freely in a given axial direction in a magnetic field as a function of the electrical voltage applied to it, thereby producing acoustic vibrations.

The primary resonator 200 includes at least one permanent magnet 210 in a fixed position, the magnetic axis of which is perpendicular to the plane of the vibrating element 160. The direction of the magnetic axis of the permanent magnet 210 is hereinafter referred to as the primary axial direction 110. The permanent magnet 210 mounted on the support member 120 provides an extremely strong, homogeneous magnetic field for the primary resonator 200. The material of the permanent magnet 210 is preferably neodymium or a neodymium-containing material or alloy.

Preferably, a first coil 220 is fixedly arranged around the permanent magnet 210. The central axis of the first coil 220 is parallel to the primary axial direction 110. The homogeneity of the magnetic field of the first coil 220 arranged on the permanent magnet 210 and the strength of the magnetic field are enhanced by the permanent magnet 210, so that the linearity of the transmission characteristic of the primary resonator 200 can be improved by using the permanent magnet 210 and the first coil 220 together.

Arranged around the first coil 220 is a moving coil unit comprising a support member 230 and a second coil 240 disposed thereon. The support member 230 is substantially of a cylindrical annular shape, with the second coil 240 preferably wound on the outer surface of its cylindrical shell. An air gap is formed between the inner surface of the moving coil unit and the first coil 220 so that the support member 230 having the second coil 240 can be moved along the primary axial direction 110 relative to the first coil 220.

Preferably, the primary resonator 200 may have a first magnetic shield 250 on the side of the support member 120 facing an intermediate member 140 and a second magnetic shield 260 on the side of the intermediate member 140 facing the support member 120.

The shielding elements 250, 260 magnetically isolate the permanent magnetic field in the primary resonator 200 from other parts of the hybrid sound vibrating device 100. The magnetic shielding elements 250, 260 are preferably made of a material with high magnetic permeability.

Figure 2:
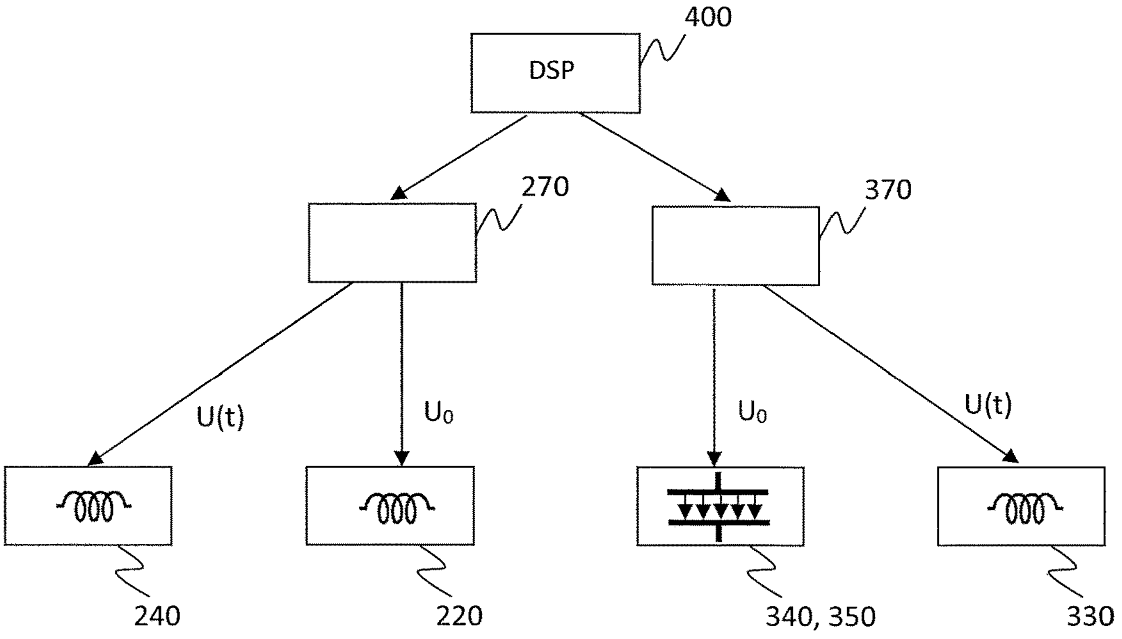

For operating the primary resonator 200, the hybrid sound radiation device 100 includes a control circuit 270 as shown in FIG. 2 that provides the applies corresponding voltage to the first coil 220, and provides a voltage signal at audio frequencies to the second coil 240 so that the primary resonator 200 (or more precisely its moving coil) generate mechanical vibrations in the frequency range of 20 Hz to 20,000 Hz. The control circuit 270 includes conventional electronic circuit units for the above-mentioned purposes, which are well known for those skilled in the art.

The end of the support member 230 remote from the support member 120 is secured to the first side of a movable intermediate member 140. The support member 120 further has at least one, preferably four guide support members 130 which, on the one hand, carry and, on the other hand, guide the reciprocating intermediate member 140 following the vibration of the moving coil along the primary axial direction 110. The vibrations of the second coil 240 are thus transmitted to the intermediate element 140 substantially undistorted.

The intermediate member 140 is preferably formed of a composite material, thereby minimizing the weight of the intermediate member 140 and undesired intrinsic vibrations while maintaining mechanical efficiency. In a preferred embodiment of the device 100, the guide support member 130 is connected to the intermediate member 140 by damping members 134 made of rubber. The purpose of the directional damping is to absorb and dampen any vibrations and resonances in the structural elements other than the vibrating element 160 in order to allow such vibrations to pass to the rear support element 120 as little as possible (or preferably not at all), said rear support element being in a direct connection with the static structure of the building in many cases.

The guide support member 130 neutralizes the shear force acting on the unit 240 formed of the coil 240 and the permanent magnet 210. In order to minimize possible negative effects on the sound, the guide support elements 130 should preferably be connected to the intermediate element 140 via said damping members.

A secondary resonator 300 is connected to the second side of the intermediate element 140 opposite to the first side. The function of the secondary resonator 300 is to transmit the mechanical vibrations generated by the primary resonator 200 to the heavy-weight vibrating element 160.

The secondary resonator 300 includes a fluid reservoir 320 with a side wall 320 of variable length along the primary axial direction 110. The variable length sidewall 320 is preferably comprised of wall portions sealed to each other, but optionally the sidewall may be a wall of flexible, resilient sheet by bending the length of the fluid reservoir along the primary axial direction 110.

A third coil 330 is arranged around the fluid reservoir, the central axis of which is parallel to the primary axial direction 110 and which generates a magnetic field inside the fluid reservoir.

A first electrode 340 is arranged on the side of the fluid reservoir connected to the intermediate member 140, preferably inside the fluid reservoir, and a second electrode 350 of opposite polarity is arranged vis-a-vis to the first electrode, preferably also inside the fluid reservoir, to create a substantially constant electric field inside the fluid reservoir.

The fluid reservoir is filled with a medium 310 consisting of a mixture of at least two non-Newtonian fluids and a magnetizable fluid. One non-Newtonian fluid is a thixotropic composite elastomer such as polydimethylsiloxane (PDMS, $C_2H_6OSi$). The other non-Newtonian fluid has rheopectic properties, such as lithium hydroxystearate ($C_{18}H_{35}LiO_3$), mixed with silicone oil. The proportion of rheopectic material in the mixture is approx. 20% by volume, i.e. the mixture contains approx. 80% by volume of silicone oil. The ratio of the two non-Newtonian fluids in the medium 310 is preferably approximately 30% by volume thixotropic fluid and 70% by volume rheopectic fluid.

The medium 310 also includes a magnetorheological fluid so that the entire medium 310 is continuously in an electric field through the electrodes 340, 350 to vibrate the medium at an audio frequency. The volume ratio of the magnetorheological fluid in the medium 310 is preferably close to 40%.

As the magnetorheological material, for example, a magnetite-based magnetic fluid is used in which coarser particles (about 0.1 to 50 micrometers in diameter) of dispersed magnetite or iron particles are dispersed. The magnetorheological fluid thus obtained behaves in the same way in the external magnetic field as the electrorheological fluids in an external electric field, i.e. its particles are organized into chains and columns parallel to the lines of force by the magnetic field, as a result of which the fluid viscosity increases by orders of magnitude. After the termination of the magnetic field, the chaining ceases within a few milliseconds, and the viscosity of the fluid returns to its original value.

For optimal operation, the temperature of the medium 310 should preferably be between 1° C. and 70° C. The volume of the liquid container is preferably of the order of approx. 50 $cm^3$.

The magnetorheological fluid forming the medium 310 preferably contains iron oxide (FeO) particles having a particle size of a few tens of nanometers to a few micrometers. Under the influence of the time-varying magnetic field provided by the third coil 330, the medium 310 continuously changes its size in the liquid container in the primary axial direction 110. This resizing can take place up to approx. 5,000 times per second.

The medium 310 in the fluid reservoir is maintained in a substantially constant electric field by means of the electrodes 340, 350. This electrical bias is required to adjust the optimum viscosity of the medium 310 containing the two non-Newtonian fluids and the meteorological fluid. The constant electric field strength can be fine-tuned using a control circuit 370 based on the acoustic field characteristics and the physical characteristics of the acoustic waves generated by the hybrid sound radiation device 100 using acoustic field measurements, but this does not significantly affect the electric field constancy.

An appropriate mixture of the two non-Newtonian fluids and the magnetorheological fluid results in a medium of substantially constant viscosity as a function of frequency, while said medium behaves as a sufficiently high-mass, high-inertia vibrating medium in a relatively wide frequency range (about 200 Hz to 5 kHz), thereby becoming capable of transmitting the mechanical vibrations generated by the primary resonator 200 to the heavy-weight vibrating element 160 with minimal distortion.

For operating the secondary resonator 300, i.e. for controlling the magnetic and electric fields of the medium 310, the device 100 according to the invention comprises a control circuit 370 shown in FIG. 2 which provides a suitable voltage to the electrodes 340, 350 and which provides an audio frequency signal to the coil 330. The control circuit 370 operates the secondary resonator 300 so that the operation of the hybrid sound radiation device 100 as a whole is substantially linear.

The hybrid sound radiation device 100 of the present invention may further include a special frequency transmission and pulse response compensation digital signal processing unit (DSP) 400, as shown in FIG. 2, and various acoustic sensors 402 for compensating, by means of the control circuits 270 and 370, the possible acoustic distortions observed in the irradiated space.

Figure 5:
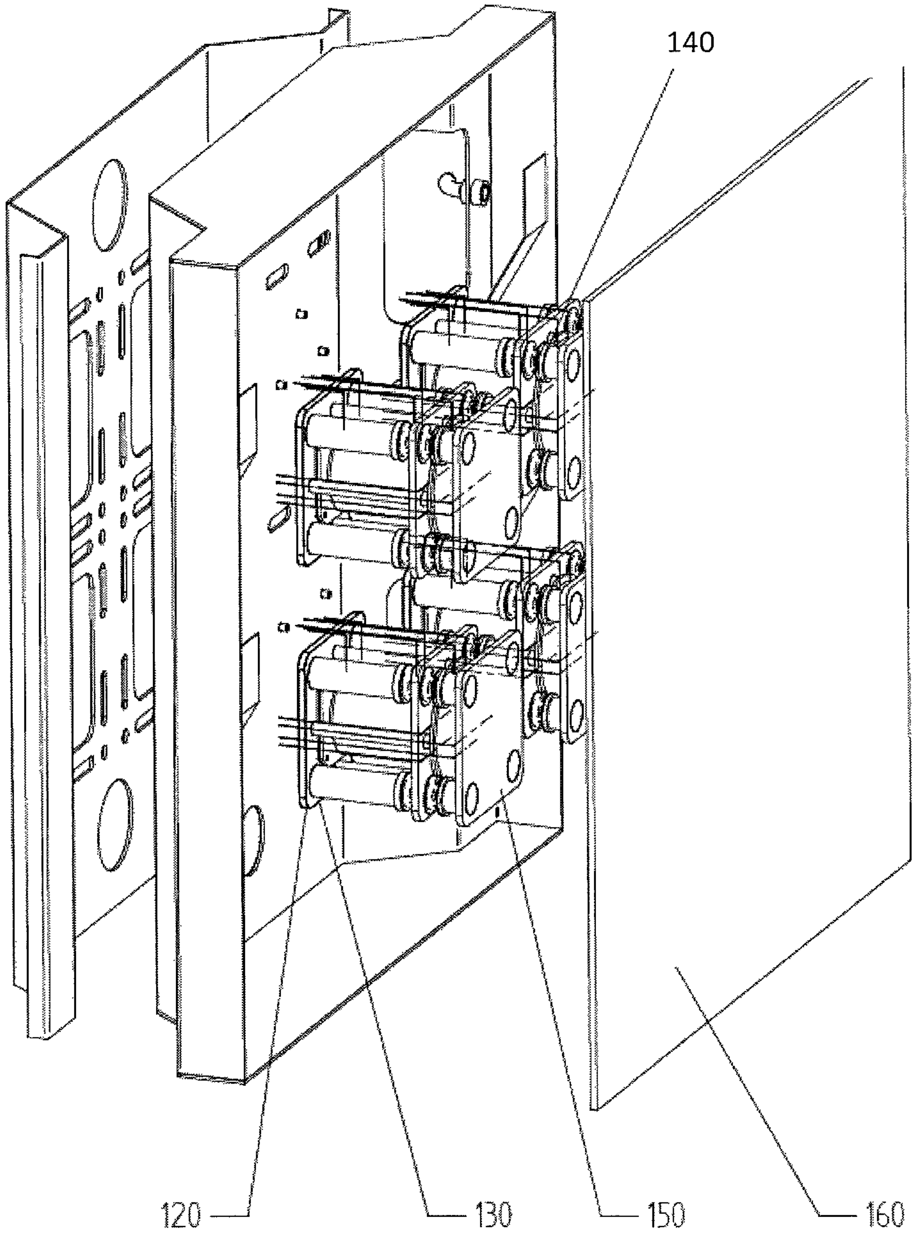
FIG. 5 shows a hybrid sound vibrating device according to the invention in a ready-to-install, assembled state.

On the side of the secondary resonator 300 opposite the intermediate element 140, a vibration-transmitting element 150 is preferably arranged rigidly, preferably by gluing, to the corresponding wall of the liquid container, on the one hand, and to the heavy-weight vibration element 160, on the other hand. Not only one, but also several, for example four, secondary resonators 300 can be connected to the vibration-transmitting element 150, as shown in FIG. 5, thereby a substantial amount of vibration energy can be transferred to the vibrating element 160 of higher mass as well.

Figure 3:
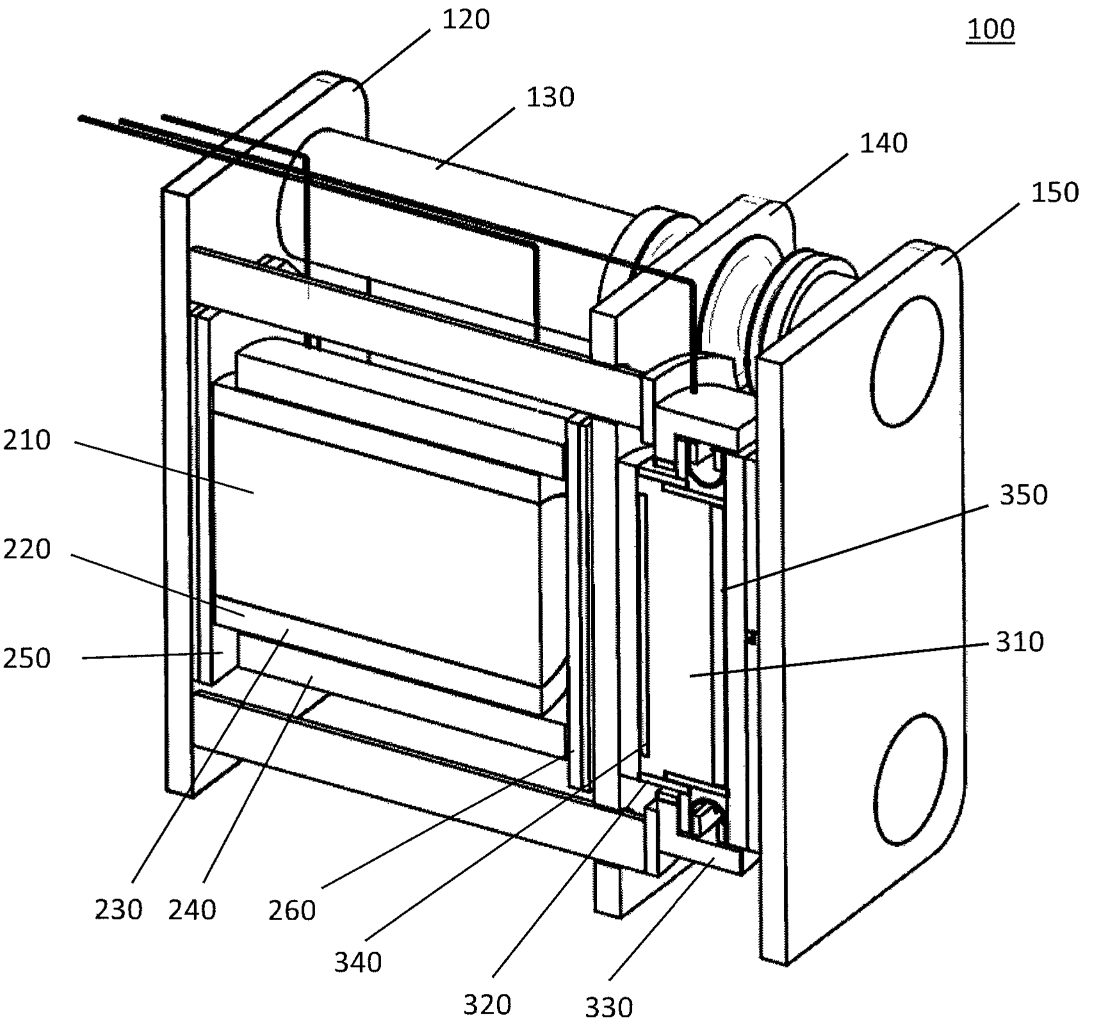
FIG. 3 shows the structural design of a hybrid sound vibrating device according to the invention, partly in a longitudinal sectional view and partly in a perspective view.
Figure 4:
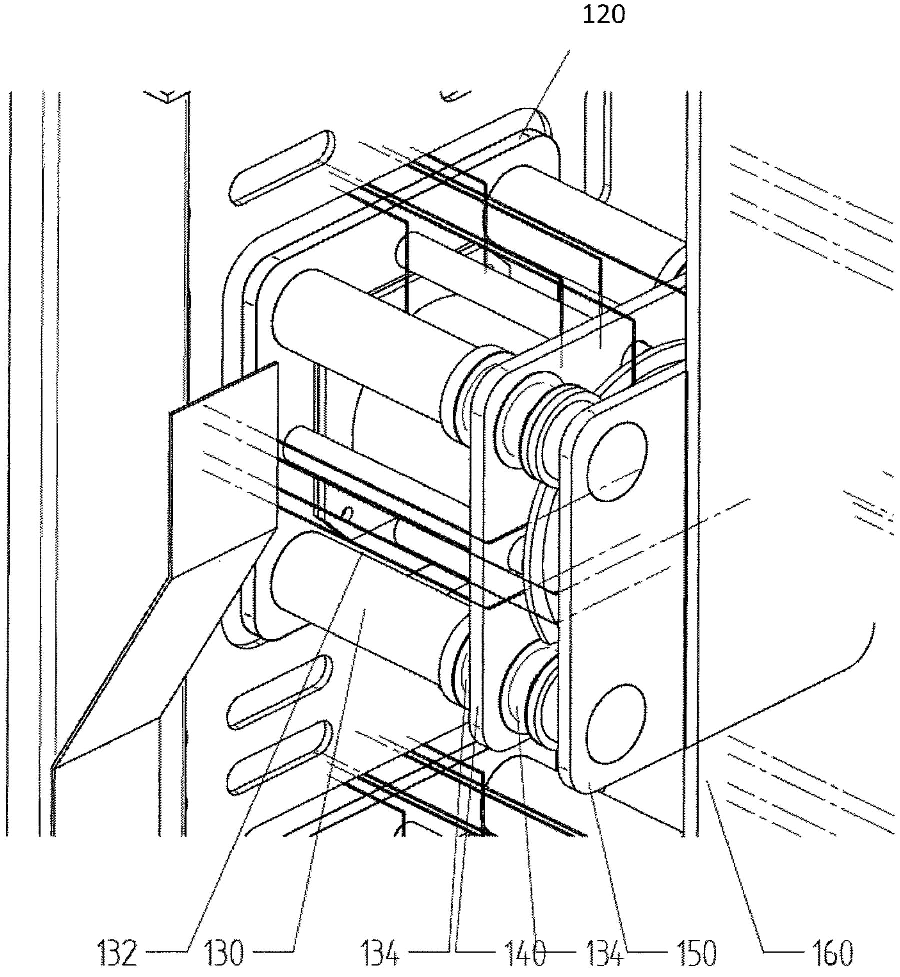
FIG. 4 is a perspective view of the construction of a hybrid sound vibrating device according to the invention.

In a preferred embodiment of the hybrid sound radiation device 100 of the present invention, the surface of the vibrating element 160 is about 1 m2 to 20 m2 and the vibration transmitting element 150 is secured to the vibrating element 160 by gluing. The glue used forms a high-strength layer with minimal flexibility in order to transmit the vibration of the vibration-transmitting element 150 to the vibration element 160 with as little distortion and damping as possible. On the other side of the vibration-transmitting element 150, as shown in FIGS. 3 and 4, it can be connected to the outer end of a piston 132 movably disposed inside the guide support member 130, so that the vibration-transmitting element 150 assists in carrying the vibrator 160 thereby relieving the fluid reservoir.

Although not shown in the drawings, the hybrid sound radiation device 100 further comprises additional conventional electronic units, e.g. power supply, wiring, circuit breakers if necessary, etc. The design and operation of these units are well known to those skilled in the art and will not be described in detail herein.

Under real conditions, the hybrid sound radiation device 100 may be provided with additional speakers, preferably tweeters and subwoofers, to meet higher user requirements. The auxiliary speakers are preferably concealed in the vicinity of the hybrid sound radiation device 100 of the present invention.

The advantage of the hybrid sound radiation device according to the invention is that heavy-weight rigid panels, such as wall cladding panels, can also be used as vibrating elements of a speaker, thus eliminating the need for conventional speakers that may adversely affect the decorative appearance of the room or its units can be installed completely concealed behind the wall cladding element or furniture panel used as the vibrating element.

A further advantage of the device according to the invention over, for example, a conventional wall-mounted loudspeaker is that minor damage or defects do not interfere with its operation. Due to its large vibrating element and its special design, the hybrid sound radiation device has a wide directional characteristic, which leads to a spatial distribution of sound and good speech characteristics.

The invention claimed is:

1. A hybrid sound radiation device (100) for vibrating a heavy-weight rigid plate at audio frequencies, the device comprising:
- a fixed support member (120);
- a permanent magnet (210), one end of which is fixed to the support member (120);
- a fixed first coil (220) arranged around the permanent magnet (210), the central axis of which defines a primary axial direction (110);
- a second coil (240) disposed around the first coil (220) and movable along the primary axial direction (110),
- an intermediate member (140) to a first side of which an end of the second coil (240) remote from the support member (120) is attached and said intermediate member (140) is guided along guide support members (130) attached to the support member (120) and extends in the primary axial direction (110);
- a fluid reservoir attached to the second side of the intermediate member (140) opposite the first side, having a side wall of variable length along the first axial direction (110), and
  - wherein the fluid reservoir contains a medium (310) comprising at least one thixotropic fluid and a predetermined mixture of a rheopectic fluid and a magnetorheological fluid, wherein the three-fluid medium (310) has a substantially constant viscosity as a function of frequency, and
  - wherein a third coil (330) is arranged around the side wall (320) of the fluid reservoir, the central axis of which is parallel to the primary axial direction (110), and
  - wherein a first electrode (340) and a second electrode (350) of opposite polarity are provided in the fluid reservoir at its side connected to the intermediate member (140), the electrodes (340, 350) providing a substantially constant electric field inside the fluid reservoir;
- a vibrating element (160) in the form of a heavy-weight, rigid, planar plate rigidly connected to the side of the fluid reservoir opposite the intermediate member (140); and
- control circuits (270, 370) connected to the first, second and third coils (220, 240, 330) and the electrodes (340, 350).

2. The device of claim 1, wherein the second coil (240) has a cylindrical annular support member (230).

3. The device according to claim 1, wherein the side of the support member (120) facing the intermediate member (140) and the side of the intermediate member (140) facing the support member (120) have a magnetic shielding element (250, 260).

4. The device according to claim 1, wherein the material of the vibrating element (160) is gres, stone, glass or wood.

5. The device according to claim 1, wherein a vibration-transmitting element (150) is arranged between the fluid reservoir and the vibrating element (160).

6. The device according to claim 1, wherein the thixotropic fluid is a composite elastomer, in particular polydimethylsiloxane.

7. The device according to claim 1, wherein the rheopectic fluid is a mixture of lithium hydroxystearate and silicone oil.

* * * * *